United States Patent Office 2,839,489
Patented June 17, 1958

2,839,489

METHOD OF MAKING POLYEPOXIDE MODIFIED OXYALKYLATION DERIVATIVES, SAID DERIVATIVES OBTAINED IN TURN BY OXYALKYLATION OF PHENOL-ALDEHYDE RESINS AND PRODUCT RESULTING THEREFROM

Melvin De Groote, St. Louis, and Kwan-Ting Shen, Brentwood, Mo., assignors to Petrolite Corporation, Wilmington, Del., a corporation of Delaware No Drawing. Original application November 19, 1953, Serial No. 393,222, now Patent No. 2,792,355, dated May 14, 1957. Divided and this application January 22, 1957, Serial No. 635,150

3 Claims. (Cl. 260—43)

The present application is a continuation-in-part of our co-pending applications, Serial Nos. 343,804, filed March 20, 1953, now abandoned, and Serial No. 349,972, filed April 20, 1953, now U. S. Patent No. 2,792,353, dated May 14, 1957, and a division of our copending application Serial No. 393,222, filed November 19, 1953, now U. S. Patent No. 2,792,355, dated May 14, 1957.

The first of said copending applications relates to processes for breaking petroleum emulsions of the water-in-oil type employing a demulsifier including the reaction products of (A) certain oxyalkylated phenol-aldehyde resins, therein described in detail, and (B) certain phenolic polyepoxides and cogenerically associated compounds formed in their preparation, also therein described in detail, the ratio of reactant (A) to reactant (B) being in the proportion of two moles of (A) to one mole of (B).

The second of the aforementioned co-pending applications is comparable to the above application, Serial No. 343,804, except that the polyepoxide employed is a non-aryl hydrophile polyepoxide which is therein described in detail.

Note that in both patent applications the molal ratio of oxyalkylated resin to polyepoxide is 2 to 1.

In our 2 copending applications, Serial Nos. 393,221, now U. S. Patent No. 2,819,212, dated January 7, 1958, and 393,223, now U. S. Patent No. 2,792,356, dated May 14, 1957, the same situation applies except that the molar ratio is 4 to 3 instead of 2 to 1. Co-pending application, Serial No. 393,221 employs the same type of polyepoxide as in Serial No. 343,804. Likewise, co-pending application, Serial No. 393,223 employs the same type of epoxide as co-pending application, Serial No. 349,972.

In the present application the molal ratio again is 4 to 3 and not 2 to 1 and involves both types of polyepoxides. Stated another way, the hydrophobe polyepoxide described in Serial No. 343,804 is employed first in a 2 to 1 ratio, and then 2 moles of this larger molecule are united by one mole of the hydrophile polyepoxide described in Serial No. 349,972. Thus, it is obvious that the present application employs the products described in Serial No. 343,804 as an intermediate. For this reason much of the text is identical with that found in Serial No. 343,804 but that part of the text which describes the hydrophile polyepoxide in Serial No. 349,972 also appears in the present description.

Thus the present invention relates to new chemical products or compounds useful as demulsifying agents in processes or procedures particularly adapted for preventing, breaking or resolving emulsions of the water-in-oil type and particularly petroleum emulsions. The new products are the reaction products of (A) certain oxyalkylated phenol-aldehyde resins, hereinafter described in detail, and (B) certain phenolic polyepoxides and cogenerically associated compounds formed in their preparation, hereinafter described in detail, further reacted with (C) certain non-aryl hydrophile polyepoxides, also hereinafter described in detail. The reactants (A) and (B) are reacted in the molar proportion of 2 to 1 respectively to form an intermediate (ABA) and this intermediate is reacted with (C) in the molar proportion of 2 to 1 respectively to produce the final reaction product (ABACABA).

These products are obtained from certain hydroxylated heat-stable resins, which, since they are heat-stable, are also susceptible to reaction in various ways to yield products other than oxyalkylation products, such as imine derivatives. Such imine derivatives may be obtained, for example, by subjecting the resins to reaction with ethylene imine, propylene imine, or similar imines rather than reaction with ethylene oxide, propylene oxide, etc. Comparable compounds are obtained by derivatives which, in addition to having the imine radical, have on ether linkage such as

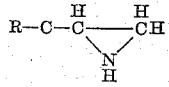

wherein R is a comparatively small alkyl radical, such as methyl, ethyl, propyl, etc. In light of this fact, i. e., that the reaction products of the selected resins herein described and the epoxides are apparently new per se and may be utilized in a manner other than specifically described herein, it is obvious they represent part of the instant invention. The resultants obtained by reaction between the resinous materials and the imine type reactant exemplify new compounds having properties usually found in cationic surface-active agents and can be used for the purposes for which these materials are commonly employed. The materials so obtained are still susceptible to oxyalkylation with an alkylene oxide, such as ethylene oxide, propylene oxide, etc., and can be reacted with these oxides in the same manner as herein described in connection with the resinous materials which have not been subjected to the intermediate reaction with an imine.

Actually any reference in the claims or specification to the property of being "oxyalkylation-susceptible" might just as properly be characterized as being "imine-reactive" or for that matter as "oxyalkylation-susceptible and imine-reactive."

The products obtained by reaction between the oxyalkylated derivatives and the polyepoxides are obviously acylation-susceptible as well as being oxyalkylation-susceptible. For instance, they could be subjected to reaction with alkiene oxides different than those previously described as, for example, styrene oxide. These derivatives additionally must have a number of aliphatic hydroxyl groups. Such aliphatic hydroxyl groups as differentiated from phenolic hydroxyl groups present in one of the initial reactants are particularly susceptible to acylation with various carboxylic and non-carboxylic acids. They may be reacted with detergent-forming monocarboxy acids particularly higher fatty acids, which are saturated or unsaturated, as well as polycarboxy acids, such as phthalic anhydride, maleic anhydride, etc. Similarly, they can be reacted with maleic acid or a fractional maleic acid ester, such as thermono-octyl ester of maleic acid, and the neutral ester obtained can be reacted with sodium bisulfite so as to introduce a sulfonic group.

Not withstanding the fact that subsequent data will be presented in considerable detail, yet the description becomes somewhat involved and certain facts should be kept in mind. The polyepoxides, and particularly the diepoxides may have no connecting bridge between the phenolic nuclei as in the case of a diphenyl derivative, or may have a variety of connecting bridges, i. e., divalent linking radicals. Our preference is that either diphenyl compounds be employed or else compounds where the divalent link is obtained by the removal of a carbonyl oxygen atom as derived from a ketone or aldehyde.

As far as the hydrophobe polyepoxides go and particularly the hydrophobe diglycidyl ethers, used in the first stage or the preparation of the intermediate, if it were not for the expense involved in preparating and purifying the monomer we would prefer it to any other form, i. e., in preference to the polymer or mixture of polymer and monomer.

Stated another way we would prefer to use materials of the kind described as first-stage reactants, for example, in U. S. Patent 2,530,353, dated November 14, 1950. Said patent described compounds having the general formula

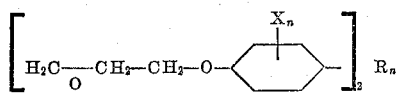

Wherein R is an aliphatic hydrocarbon bridge, each $n$ independently has one of the values 0 to 1, and X is an alkyl radical containing from 1 to 4 carbon atoms.

The compounds having two oxirane rings and employed for combination with the reactive oxyalkylated phenol-aldehyde resin are characterized by the following formula and cogenerically associated compounds formed in their preparation:

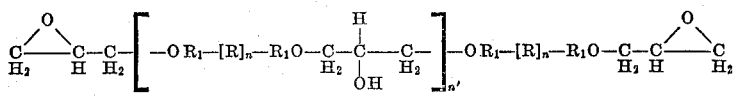

in which R represents a divalent radical selected from the class of ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—, the divalent radical

—CH₂SCH₂— and the divalent disulfide radical —S—S—; and $R_1O$ is the divalent radical obtained by the elimination of a hydroxyl hydrogen atom and a nuclear hydrogen atom from the phenol

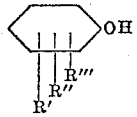

in which R′, R″, and R‴ represent hydrogen and hydrocarbon substitutents of the aromatic nucleus, said substituent member having not over 18 carbon atoms; $n$ represents an integer including zero and 1, and $n'$ represents a whole number not greater than 3. The above mentioned compounds and those associated compounds formed in their preparation are thermoplastic and organic solvent-soluble. Reference to being thermoplastic characterizes products as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with the resin. In such instances, of course, the solvent selected would have to be one which is not susceptible to oxyalkylation, as, for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter, the word "epoxy," unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of a strictly formal nomenclature as in the example of the simplest diepoxide which contains at least 4 carbon atoms and is formally described as 1,2-epoxy-3,4-epoxybutane (1,2-3,4-diepoxybutane).

It well may be that even though the previously suggested formula represents the principal component, or components, of the result or reaction product described in the previous test, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not resins and have certain solubility characteristics not inherent in resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. The intent in the present instance in a comparable example would be to use a sulfonamide (not a sulfonamide resin) and obtain a material which does not have the characteristics of an ordinary varnish resin or the like, i. e., is permanently soluble, and stays soluble generally as a liquid of ordinary viscosity, or as a thick viscous liquid and may be a thermoplastic solid, and additionally even may be water-soluble.

Having obtained a reactant having generally 2 epoxy rings as depicted in the last formula preceding, or low molal polymers thereof, it becomes obvious the reaction can take place with any one of a number of oxyalkylated resins which are still oxyalkylation-susceptible. There is available considerable literature, particularly patent literature dealing with oxyalkylated resins of the kind herein employed for reaction with the selected polyepoxides. These will be referred to in greater detail subsequently. For purpose of convenience, reference is simply made at the moment to the following patents: U. S. Patent Nos. 2,499,365; 2,499,366; 2,499,367; 2,499,368; and 2,499,370, all dated March 7, 1950 to De Groote and Keiser.

To illustrate the products which represent the subject matter of the present invention reference will be made to a reaction involving a mole of the olyalkylating agent, i. e. the compound having two oxirane rings and oxyalkylated

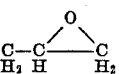

resins as described. Proceeding with the example previously described it is obvious the reaction ratio of two moles of the oxyalkylated resin to one mole of diepoxide gives a product which may be indicated as follows:

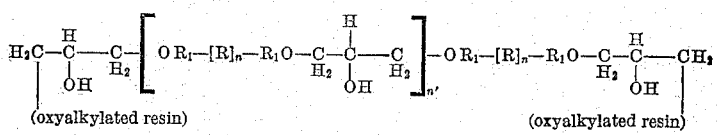

(oxyalkylated resin)              (oxyalkylated resin)

in which the various characters have their prior significance. However, molal ratios may be varied as noted subsequently.

Such products must be soluble in suitable solvents such as a non-oxygenated hydrocarbon solvent or an oxygenated hydrocarbon solvent, or for that matter, a mixture of the same with water. Needless to say, after the resin has been treated with a large amount of ethylene oxide the products are water soluble and may be soluble in an acid solution.

The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or at least distinct dispersibility in water. For instance, the products freed from any solvent can be shaken with five to twenty times their weight of distilled water at ordinary temperature and are at least self-dispersing, and in many instances water-soluble, in fact colloidally soluble.

Basic nitrogen atoms can be introduced into such derivatives by use of a reactant having both a nitrogen group and a 1,2-epoxy group, such as 3-dialkylamino-epoxypropane. See U. S. Patent No. 2,520,093, dated August 22, 1950, to Gross.

As far as the use of the herein described products goes for the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of monoepoxides, in such manner that the derivatives so obtained have sufficient hydrophile character to meet at least the test set forth in U. S. Patent No. 2,499,368, dated March 7, 1950, to De Groote, et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Reference is made again to U. S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this text with the same force and effect as if it were herein included. This, in essence, means that the preferred product for resolution of petroleum emulsions of the water-in-oil type, is characterized by the fact that a 50–50 solution in xylene, or its equivalent, when mixed with one to three volumes of water and shaken will produce an emulsion.

For purpose of convenience what is said hereinafter will be divided into ten parts with Part Three, in turn, being divided into three subdivisions;

Part 1 is concerned with our preference in regard to the hydrophobe type of polyepoxide and particularly the hydrophobe type of diepoxide reactant, i. e., the one that enters into the formation of the intermediate ABA.

Part 2 is concerned with certain theoretical aspects of diepoxide prepared with the hydrophobe type, i. e., the one identified as Type B, preceding.

Part 3, Subdivision A, is concerned with the preparation of monomeric hydrophobe type diepoxides, including Table I.

Part 3, Subdivision B, is concerned with the preparation of low molal hydrophobe type polymeric epoxides or mixtures containing low molal hydrophobe type polymeric epoxides as well as the monomer and includes Table II.

Part 3, Subdivision C, is concerned with miscellaneous phenolic reactants suitable for low molal hydrophobe type diepoxide preparation.

Part 4 is concerned with suitable phenol-aldehyde resins to be employed for reaction with the epoxides.

Part 5 is concerned with the oxyalkylation of the previously described phenol-aldehyde resins.

Part 6 is concerned with the procedure involving preparation of an intermediate by reaction between 2 moles of the oxyalkylated phenol-aldehyde resin and one mole of the diglycidyl ether for example (identical with the products described in aforementioned copending application, Serial No. 343,804) followed by a second step in which 2 moles of these larger molecules are combined with use of a single mole of a diglycidyl ether or the like. This intermediate has been described previously as ABA.

Part 7 is concerned with suitable hydrophile nonaryl polyepoxides, and particularly diepoxides employed as the reactant in uniting 2 moles of the intermediate ABA by means of a hydrophile epoxide and particularly a hydrophile diepoxide described as (C) to yield the final product described as ABACABA.

Part 9 is concerned with the resolution of petroleum emulsions of the water-in-oil type by means of the previously described chemical compounds or reaction products; and Part 10 is concerned with uses for the products herein described, either as such or after modification, including uses in applications other than those involving resolution of petroleum emulsions of the water-in-oil type.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the cogeneric mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are ither united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

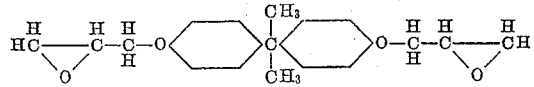

Reference has just been made to bis-phenol A and a suitable epoxide derived therefrom. Bis-phenol A is dihydroxy-diphenyl-dimethyl methane, with the 4,4′ isomers predominating and with lesser quantities of the 2,2′ and 4,2′ isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. A number of problems are involved in attempting to produce these materials free from cogeneric materials of related composition. For a discussion of these difficulties, reference is made to U. S. Patent No. 2,819,212, beginning at column 7, line 21.

PART 3

Subdivision A

The preparations of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1a | $CH_2(C_6H_4OH)_2$ | Di(epoxypropoxyphenyl)methane | 2,506,486 |
| 2a | $CH_3CH(C_6H_4OH)_2$ | Di(epoxypropoxyphenyl)methylmethane | 2,506,486 |
| 3a | $(CH_3)_2C(C_6H_4OH)_2$ | Di(epoxypropoxyphenyl)dimethylmethane | 2,506,486 |
| 4a | $C_2H_5C(CH_3)(C_6H_4OH)_2$ | Di(epoxypropoxyphenyl)ethylmethylmethane | 2,506,486 |
| 5a | $(C_2H_5)_2C(C_6H_4OH)_2$ | Di(epoxypropoxyphenyl)diethylmethane | 2,506,486 |
| 6a | $CH_3C(C_3H_7)(C_6H_4OH)_2$ | Di(epoxypropoxyphenyl)methylpropylmethane | 2,506,486 |
| 7a | $CH_3C(C_6H_5)(C_6H_4OH)_2$ | Di(epoxypropoxyphenyl)methylphenylmethane | 2,506,486 |
| 8a | $C_2H_5C(C_6H_5)(C_6H_4OH)_2$ | Di(epoxypropoxyphenyl)ethylphenylmethane | 2,506,486 |
| 9a | $C_3H_7C(C_6H_5)(C_6H_4OH)_2$ | Di(epoxypropoxyphenyl)propylphenylmethane | 2,506,486 |
| 10a | $C_4H_9C(C_6H_5)(C_6H_4OH)_2$ | Di(epoxypropoxyphenyl)butylphenylmethane | 2,506,486 |
| 11a | $(CH_3C_6H_4)CH(C_6H_4OH)_2$ | Di(epoxypropoxyphenyl)tolylmethane | 2,506,486 |
| 12a | $(CH_3C_6H_4)C(CH_3)(C_6H_4OH)_2$ | Di(epoxypropoxyphenyl)tolylmethylmethane | 2,506,486 |
| 13a | Dihydroxy diphenyl | 4,4′-bis(2,3-epoxypropoxy)diphenyl | 2,530,353 |
| 14a | $(CH_3)C(C_4H_5.C_6H_3OH)_2$ | 2,2-bis(4-(2,3-epoxypropoxy)2-tertiarybutyl phenyl)propane | 2,530,353 |

Subdivision B

As to the preparation of low-molal polymeric epoxides or mixtures reference is made to numerous patents and particularly the aforementioned U. S. Patents Nos. 2,575,558 and 2,582,985.

In light of aforementioned U. S. Patent No. 2,575,558, the following examples can be specified by reference to the formula therein provided one still bears in mind it is in essence an over-simplification.

TABLE II

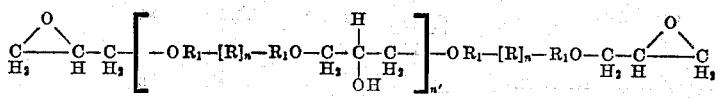

(in which the characters have their previous significance)

| Example number | —R₁O— from HR₁OH | —R— | $n$ | $n'$ | Remarks |
|---|---|---|---|---|---|
| B1 | Hydroxy benzene | CH₃<br>-C-<br>CH₃ | 1 | 0,1,2 | Phenol known as bis-phenol A. Low polymeric mixture about ⅔ or more where $n'=0$, remainder largely where $n'=1$, some where $n'=2$. |
| B2 | ----do---- | CH₃<br>-C-<br>CH₂<br>CH₃ | 1 | 0,1,2 | Phenol known as bis-phenol B. See note regarding B1 above. |
| B3 | Orthobutylphenol | CH₃<br>-C-<br>CH₃ | 1 | 0,1,2 | Even though $n'$ is preferably 0, yet the usual reaction product might well contain materials where $n'$ is 1, or to a lesser degree 2. |
| B4 | Orthoamylphenol | CH₃<br>-C-<br>CH₃ | 1 | 0,1,2 | Do. |
| B5 | Orthooctylphenol | CH₃<br>-C-<br>CH₃ | 1 | 0,1,2 | Do. |
| B6 | Orthononylphenol | CH₃<br>-C-<br>CH₃ | 1 | 0,1,2 | Do. |
| B7 | Orthododecylphenol | CH₃<br>-C-<br>CH₃ | 1 | 0,1,2 | Do. |
| B8 | Metacresol | CH₃<br>-C-<br>CH₃ | 1 | 0,1,2 | See prior note. This phenol used as initial material is known as bis-phenol C. For other suitable bis-phenols see U. S. Patent 2,564,191. |
| B9 | ----do---- | CH₃<br>-C-<br>CH₂<br>CH₃ | 1 | 0,1,2 | See prior note. |
| B10 | Dibutyl (ortho-para) phenol | H<br>-C-<br>H | 1 | 0,1,2 | Do. |
| B11 | Diamyl (ortho-para) phenol | H<br>-C-<br>H | 1 | 0,1,2 | Do. |
| B12 | Dioctyl (ortho-para) phenol | H<br>-C-<br>H | 1 | 0,1,2 | Do. |
| B13 | Dinonyl (ortho-para) phenol | H<br>-C-<br>H | 1 | 0,1,2 | Do. |
| B14 | Diamyl (ortho-para) phenol | H<br>-C-<br>CH₃ | 1 | 0,1,2 | Do. |
| B15 | ----do---- | H<br>-C-<br>C₂H₅ | 1 | 0,1,2 | Do. |
| B16 | Hydroxy benzene | O<br>-S-<br>O | 1 | 0,1,2 | Do. |

TABLE II Continued

| Example number | —R₁O— from HR₁OH | —R— | n | n' | Remarks |
|---|---|---|---|---|---|
| B17 | Diamyl phenol (ortho-para) | —S—S— | 1 | 0,1,2 | See prior notes. |
| B18 | ....do.... | —S— | 1 | 0,1,2 | Do. |
| B19 | Dibutyl phenol (ortho-para) | $-\underset{H}{\overset{H}{C}}-\underset{H}{\overset{H}{C}}-$ | 1 | 0,1,2 | Do. |
| B20 | ....do.... | $-\underset{H}{\overset{H}{C}}-\underset{H}{\overset{H}{C}}-$ | 1 | 0,1,2 | Do. |
| B21 | Dinonyl phenol (ortho-para) | $-\underset{H}{\overset{H}{C}}-\underset{H}{\overset{H}{C}}-$ | 1 | 0,1,2 | Do. |
| B22 | Hydroxy benzene | $-\overset{O}{\underset{}{C}}-$ | 1 | 0,1,2 | Do. |
| B23 | ....do.... | None | 0 | 0,1,2 | Do. |
| B24 | Ortho-isopropyl phenol | $-\underset{CH_3}{\overset{CH_3}{C}}-$ | 1 | 0,1,2 | See prior note. (As to preparation of 4,4'-isopropylidene bis-(2-isopropylphenol) see U. S. Patent No. 2,482,748, dated Sept. 27, 1949, to Dietzler.) |
| B25 | Para-octyl phenol | —CH₂—S—CH₂— | 1 | 0,1,2 | See prior note. (As to preparation of the phenol sulfide see U. S. Patent No. 2,488,134, dated Nov. 15, 1949, to Mikeska et al.) |
| B26 | Hydroxybenzene | $-\underset{\underset{\underset{C_2H_5}{O}}{CH_2}}{\overset{CH_3}{\underset{}{C}}}-$ | 1 | 0,1,2 | See prior note. (As to preparation of the phenol sulfide see U. S. Patent No. 2,526,545.) |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglicidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

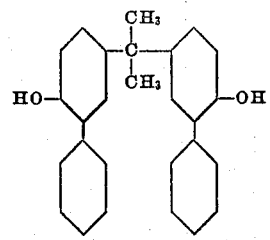

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc. Other samples include:

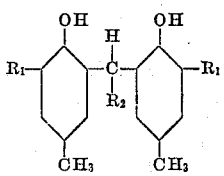

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

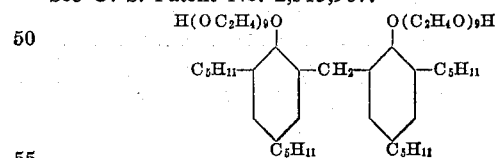

in which the —C₅H₁₁ groups are secondary amyl groups. See U. S. Patent No. 2,504,064.

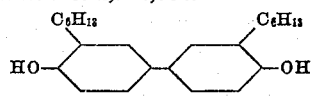

See U. S. Patent No. 2,285,563.

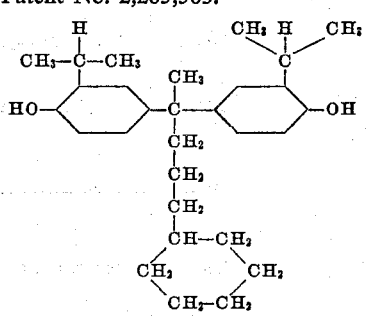

See U. S. Patent No. 2,503,196.

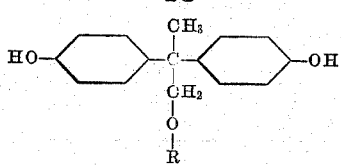

wherein R is a member of the group consisting of alkyl, and alkoxy-alkyl radicals containing from 1 to 5 carbon atoms, inclusive, and aryl and chloraryl radicals of the benzene series. See U. S. Patent No. 2,526,545.

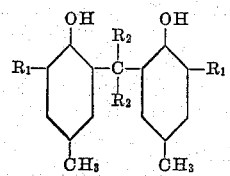

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

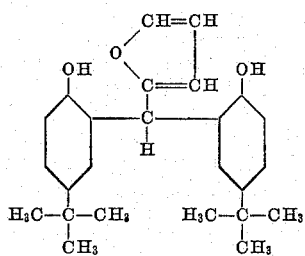

See U. S. Patent No. 2,515,908.

As to sulfides, the following compound is of interest:

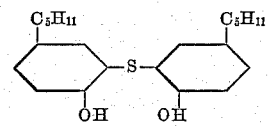

See U. S. Patent No. 2,331,448.

As to the descriptions of various suitable phenol sulfides, reference is made to the following patents: U. S. Patents Nos. 2,246,321, 2,207,719, 2,174,248, 2,139,766, 2,244,021, and 2,195,539.

As to sulfones see U. S. Patent No. 2,122,958.

As to suitable compounds obtained by the use of formaldehyde or some other aldehyde, particularly compounds such as

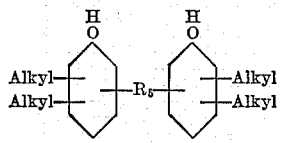

in which $R_5$ is a methylene radical, or a substituted methylene radical which represents the residue of an aldehyde and is preferably the unsubstituted methylene radical derived from formaldehyde. See U. S. Patent 2,430,002.

See also U. S. Patent No. 2,581,919 which describes di(dialkyl cresol) sulfides which include the monosulfides, the disulfides, and the polysulfides. The following formula represents the various dicresol sulfides of this invention:

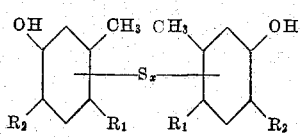

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

PART 4

This part is concerned with the preparation of phenol-aldehyde resins of the kind described in detail in U. S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially paratetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365; 2,499,366; and 2,499,367, all dated March 7, 1950, to De Groote and Keiser. These patents, along with the other two previously mentioned patents, described phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

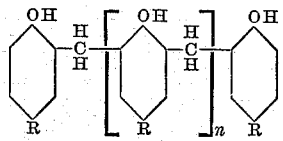

In the above formula $n$ represents a small whole number varying from 1 to 6, 7 or 8, or more, up to probably 10 or 12 units, particularly when the resin is subjected to heating under a vaccum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

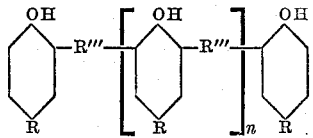

in which $R'''$ is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100th of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture, for instance, one approximating 4 phenolic nuclei will have some trimer and pentamer present. Thus, the molecular weight may be such that it corresponds to a fractional value for $n$, as for example, 3.5, 4.5 or 5.2.

In the actual manufacture of the resins we found no reason for using other than those which are lowest in price and most readily available commercially. For purpose of convenience suitable resins are characterized in the following table:

TABLE III

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |

TABLE III—Continued

| Example number | R | Position of R | R''' derived from— | n | Mol. wt. of resin molecule (based on n+2) |
|---|---|---|---|---|---|
| 23a | Tertiary amyl | Para | Formaldehyde | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 5

There have been issued a substantial number of patents which give detailed description of the preparation of oxyalkylated derivatives of resins of the kind previously described. For example, see U. S. Patents 2,499,365; 2,499,366; 2,499,367; 2,499,368; and 2,499,370, all dated March 7, 1950 to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380, and 2,581,381, all dated January 8, 1952 to De Groote and Keiser. As to further examples, see U. S. Patent 2,602,052 dated July 1, 1952 to De Groote.

The oxypropylation or, for that matter, the treatment of resins with butylene oxide, glycide, or methylglycide, has been described in the first of the series in the above mentioned patents, i. e., those issuing in 1950.

Reference is made to U. S. Patent, 2,557,081 dated June 19, 1951 to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U. S. Patent 2,581,376 and extending through column 36. We have simply numbered these products beginning with 1b, allotting, of course, five numbers to each table beginning with the first table. For convenience these sixteen tables are summarized in the following table:

TABLE IV

| Ex. No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 14.00 |
| 14b | do | do | 4.40 | 4.90 | 14.80 |
| 15b | do | do | 4.10 | 4.58 | 18.52 |
| 16b | Menthyl | do | 13.65 | 16.35 | 3.00 |
| 17b | do | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |

TABLE IV Continued

| Ex. No. | Phenol | Aldehyde | Solvent, lbs. | Resin, lbs. | Ethylene oxide, lbs. |
|---|---|---|---|---|---|
| 21b | Para-secondary butyl | Formaldehyde | 14.45 | 15.55 | 4.25 |
| 22b | ...do... | ...do... | 8.48 | 9.17 | 16.00 |
| 23b | ...do... | ...do... | 4.82 | 5.18 | 14.25 |
| 24b | ...do... | ...do... | 3.85 | 4.15 | 17.00 |
| 25b | ...do... | ...do... | 2.65 | 2.85 | 15.45 |
| 26b | Menthyl | Propionaldehyde | 12.80 | 17.20 | 2.75 |
| 27b | ...do... | ...do... | 8.55 | 11.50 | 9.30 |
| 28b | ...do... | ...do... | 3.77 | 5.08 | 13.10 |
| 29b | ...do... | ...do... | 3.77 | 5.08 | 13.10 |
| 30b | ...do... | ...do... | 2.10 | 2.83 | 9.12 |
| 31b | Para-tertiary amyl | Furfural | 11.20 | 18.00 | 3.50 |
| 32b | ...do... | ...do... | 8.45 | 13.60 | 12.65 |
| 33b | ...do... | ...do... | 4.50 | 8.00 | 14.50 |
| 34b | ...do... | ...do... | 3.42 | 5.48 | 15.10 |
| 35b | ...do... | ...do... | 2.05 | 3.65 | 13.35 |
| 36b | Menthyl | ...do... | 10.25 | 17.75 | 2.50 |
| 37b | ...do... | ...do... | 7.60 | 13.15 | 9.35 |
| 38b | ...do... | ...do... | 4.22 | 6.98 | 10.00 |
| 39b | ...do... | ...do... | 3.76 | 6.24 | 13.25 |
| 40b | ...do... | ...do... | 2.40 | 4.15 | 11.70 |
| 41b | Para-octyl | ...do... | 12.10 | 18.60 | 3.00 |
| 42b | ...do... | ...do... | 9.25 | 14.25 | 11.00 |
| 43b | ...do... | ...do... | 6.72 | 10.32 | 14.91 |
| 44b | ...do... | ...do... | 5.52 | 8.52 | 19.81 |
| 45b | ...do... | ...do... | 1.75 | 2.70 | 8.40 |
| 46b | Para-phenyl | ...do... | 13.90 | 16.70 | 3.00 |
| 47b | ...do... | ...do... | 10.35 | 12.45 | 12.20 |
| 48b | ...do... | ...do... | 8.90 | 10.70 | 19.00 |
| 49b | ...do... | ...do... | 5.20 | 6.26 | 16.64 |
| 50b | ...do... | ...do... | 3.60 | 4.32 | 15.68 |
| 51b | Para-secondary nonyl | ...do... | 10.85 | 20.75 | 3.00 |
| 52b | ...do... | ...do... | 8.28 | 15.85 | 11.77 |
| 53b | ...do... | ...do... | 5.95 | 11.35 | 16.75 |
| 54b | ...do... | ...do... | 4.46 | 8.52 | 19.07 |
| 55b | ...do... | ...do... | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | | 3.41 | 2.80 | 13.64 |
| 61b | Para-secondary butyl | Furfural | 12.00 | 17.90 | 3.50 |
| 62b | ...do... | ...do... | 9.35 | 13.92 | 13.23 |
| 63b | ...do... | ...do... | 6.25 | 8.95 | 17.00 |
| 64b | ...do... | ...do... | 4.35 | 6.50 | 18.40 |
| 65b | ...do... | ...do... | 3.02 | 4.34 | 16.49 |
| 66b | Para-octyl | Propionaldehyde | 13.30 | 16.90 | 3.00 |
| 67b | ...do... | ...do... | 10.20 | 12.90 | 11.30 |
| 68b | ...do... | ...do... | 6.46 | 8.24 | 16.50 |
| 69b | ...do... | ...do... | 3.86 | 4.87 | 13.02 |
| 70b | ...do... | ...do... | 2.94 | 3.75 | 13.26 |
| 71b | Para-nonyl | ...do... | 10.90 | 18.00 | 3.00 |
| 72b | ...do... | ...do... | 8.25 | 13.60 | 11.50 |
| 73b | ...do... | ...do... | 5.65 | 9.35 | 15.75 |
| 74b | ...do... | ...do... | 3.15 | 5.25 | 13.45 |
| 75b | ...do... | ...do... | 1.94 | 3.21 | 10.65 |
| 76b | Para-tertiary amyl | ...do... | 12.60 | 16.20 | 3.50 |
| 77b | ...do... | ...do... | 9.52 | 12.24 | 12.89 |
| 78b | ...do... | ...do... | 6.50 | 8.30 | 17.75 |
| 79b | ...do... | ...do... | 4.25 | 5.45 | 17.25 |
| 80b | ...do... | ...do... | 2.69 | 3.43 | 14.55 |

NOTE.—For ease of comparison blanks (____) appear in the above tables where blanks appear in previously mentioned tables in U. S. Patent 2,581,376.

Oxypropylated derivatives comparable to 1b through 80b as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE V

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl | Formaldehyde | 14.25 | 15.72 | 5.10 |
| 2c | 2b | ...do... | ...do... | 10.90 | 12.10 | 19.40 |
| 3c | 3b | ...do... | ...do... | 7.13 | 7.93 | 25.30 |
| 4c | 4b | ...do... | ...do... | 3.84 | 4.25 | 23.00 |
| 5c | 5b | ...do... | ...do... | 1.80 | 2.04 | 13.00 |
| 66c | 66b | Para-octyl | Propionaldehyde | 13.30 | 16.90 | 3.82 |
| 67c | 67b | ...do... | ...do... | 10.20 | 12.90 | 14.40 |
| 68c | 68b | ...do... | ...do... | 6.46 | 8.24 | 21.00 |
| 69c | 69b | ...do... | ...do... | 3.86 | 4.87 | 16.60 |
| 70c | 70b | ...do... | ...do... | 2.94 | 3.75 | 16.80 |
| 76c | 76b | Para-tertiary amyl | Formaldehyde | 12.60 | 16.20 | 4.46 |
| 77c | 77b | ...do... | ...do... | 9.52 | 12.24 | 16.45 |
| 78c | 78b | ...do... | ...do... | 6.50 | 8.30 | 22.60 |
| 79c | 79b | ...do... | ...do... | 4.25 | 5.45 | 22.00 |
| 80c | 80b | ...do... | ...do... | 2.69 | 3.43 | 18.55 |

As an illustration of oxypropylated resins involving the use of both ethylene and propylene oxide, reference is made to the aforementioned U. S. Patent 2,557,081, dated June 19, 1951 to De Groote and Keiser. The last table in column 28 of said patent describes in detail the preparation of a series of oxyalkylated resins in which both propylene and ethylene oxide are employed. Simply by way of illustration a series of 27 compounds are included, the descriptions of which apear in detail in said aforementioned U. S. Patent 2,577,081 to De Groote and Keiser.

TABLE VI

| Ex. No. | See U. S. Pat. 2,557,081 Ex. No. in above patent | Point on graph on above pat. | Resin used | Resin, lbs. | Ethylene oxide, lbs. | Propylene oxide, lbs. | Wt. of xylene | Flk. caustic soda, ounces |
|---|---|---|---|---|---|---|---|---|
| 1d | A | 1 | Tert. amyl phenol formaldehyde | 6 | 3 | 1 | 10 | 1 |
| 2d | B | 5 | ...do... | 5 | 4 | 1 | 10 | 1 |
| 3d | C | 8 | ...do... | 3 | 6 | 1 | 10 | 1 |
| 4d | D | 2 | ...do... | 1 | 21.5 | 2.5 | 25 | 2 |
| 5d | E | 9 | ...do... | 1 | 15 | 9 | 25 | 2 |
| 6d | F | 6 | ...do... | 1 | 10 | 15 | 25 | 2 |
| 7d | G | 3 | ...do... | 1 | 2.5 | 21.5 | 25 | 2 |
| 8d | H | 7 | ...do... | 5 | 1 | 4 | 10 | 1 |
| 9d | I | 4 | ...do... | 6 | 1 | 3 | 10 | 1 |
| 10d | A | 1 | Tert. butyl phenol formaldehyde | 6 | 3 | 1 | 10 | 1 |
| 11d | B | 5 | ...do... | 5 | 4 | 1 | 10 | 1 |
| 12d | C | 8 | ...do... | 3 | 6 | 1 | 10 | 1 |
| 13d | D | 2 | ...do... | 1 | 21.5 | 2.5 | 25 | 2 |
| 14d | E | 9 | ...do... | 1 | 15 | 9 | 25 | 2 |
| 15d | F | 6 | ...do... | 1 | 10 | 14 | 25 | 2 |
| 16d | G | 3 | ...do... | 1 | 2.5 | 21.5 | 25 | 2 |
| 17d | H | 7 | ...do... | 5 | 1 | 4 | 10 | 1 |
| 18d | I | 4 | ...do... | 6 | 1 | 3 | 10 | 1 |
| 19d | A | 1 | Nonyl-phenol-formaldehyde | 6 | 3 | 1 | 10 | 1 |
| 20d | B | 5 | ...do... | 5 | 4 | 1 | 10 | 1 |
| 21d | C | 8 | ...do... | 3 | 6 | 1 | 10 | 1 |
| 22d | D | 2 | ...do... | 1 | 21.5 | 2.5 | 25 | 2 |
| 23d | E | 9 | ...do... | 1 | 15 | 9 | 25 | 2 |
| 24d | F | 6 | ...do... | 1 | 10 | 14 | 25 | 2 |
| 25d | G | 3 | ...do... | 1 | 2.5 | 21.5 | 25 | 2 |
| 26d | H | 7 | ...do... | 5 | 1 | 4 | 10 | 1 |
| 27d | I | 4 | ...do... | 6 | 1 | 3 | 10 | 1 |

Note the first series of nine compounds, 1d through 9d, were prepared with a propylene oxide first and then ethylene oxide. The second 9, 10d through 18d inclusive, were prepared using ethylene oxide first and then propylene oxide, and the last 9, 19d through 27d were prepared by random oxyalkylation, i. e., using a mixture of two oxides.

In the preparation of the resins our preference is to use hydrocarbon substituted phenols, particularly para-substituted, in which the substituted radical R contains 4 to 18 carbon atoms and particularly 4 to 14 carbon atoms.

The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly diepoxides, a large number of the previously described oxyalkylated resins have been employed. For convenience, the following list is selected indicating the previously described compounds and their molecular weights. Such resins are generally employed at a 50% solution and the polyepoxide employed is a 50% solution, usually both reactants being dissolved in xylene and sufficient sodium methylate added to act as a catalyst, for instance, 1 to 2%.

TABLE VII

| Ex. No.: | Mol. wt. | Ex. No.: | Mol. wt. |
|---|---|---|---|
| 1b | 1,202 | 3c | 4,019 |
| 2b | 2,169 | 4c | 6,139 |
| 3b | 3,339 | 5c | 7,079 |
| 4b | 4,609 | 1d | 1,697 |
| 5b | 5,749 | 2d | 1,918 |
| 6b | 1,509 | 3d | 3,189 |
| 7b | 2,466 | 4d | 23,959 |
| 8b | 3,657 | 5d | 23,959 |
| 9b | 5,867 | 6d | 24,909 |
| 10b | 6,087 | 7d | 23,959 |
| 1c | 1,270 | 8d | 1,918 |
| 2c | 2,494 | 9d | 1,697 |

PART 6

As previously pointed out, having the two types of reactants required for intermediate manufacture, i. e., the oxyalkylated phenol-aldehyde resins and the diglycidyl ethers or their equivalent, one can then proceed to combine 2 moles of the oxyalkylated phenol-aldehyde resin with one mole of the ether. The reaction is essentially an oxyalkylation reaction and thus may be considered as merely a continuation of the previous oxyalkylation reaction. The previous oxyalkylation reaction involved a monoepoxide as differentiated from a polyepoxide and particularly a diepoxide. The reactions take place in substantially the same way, i. e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide, the reaction is comparatively simple. Purely from a mechanical standpoint it is a matter of convenience to conduct both classes of reactions in the same equipment. In other words, after the phenol-aldehyde resin has been reacted with ethylene oxide, propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1, 2, or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently in aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxide described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxyalkylation is employed. However, since the oxyalkylated phenol-aldehyde resins are almost invariably liquids there is no need for the presence of a solvent as when oxyalkylation involves a solid which may be rather high melting. Thus, it is immaterial whether there is a solvent present or not and it is immaterial whether solvent was added in the first stage of oxyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and removes xylene so as to bring the boiling point of the mixture to about 140° C. during part of the reaction and subsequently removing more xylene so that the mixture refluxed at somewhere between 170° to 190° C. This was purely a convenience and need not be employed unless desired.

*Example 1e*

The oxyalkylated resin employed was the one previously identified as 2b, having a molecular weight of 2169; the amount employed was 217 grams. The resin was dissolved in approximately an equal weight of xylene. The mixture was heated to just short of the boiling point of water, i. e., a little below 100° C. Approximately one-half percent of sodium methylate was added, or, more exactly, 1.1 grams. The stirring was continued until there was a solution or distribution of the catalyst. The mixture was heated to a little past 100° C. and left at this temperature while 17 grams of the diepoxide (previously identified as 3A), dissolved in an equal weight of xylene, were added. After the diepoxide was added the temperature was permitted to rise to approximately 107° C. The time required to add the diepoxide was approximately one-half hour. The temperature rose in this period to about 125° C. The temperature rise was controlled by allowing the xylene to reflux over and to separate out the xylene by a phase separating trap. In any event, the temperature was raised shortly to 138–140° C. and allowed to reflux at this temperature for almost three hours. Tests indicated that the reaction was complete at the end of this time; in fact, it probably was complete at a considerably earlier stage. The xylene which had been separated out was returned to the mixture so that the reaction mass at the end of the procedure represented about 50% reaction product and 50% solvent. The procedure employed, is, of course, simple in light of what has been said previously; in fact, it corresponds to the usual procedure employed in connection with an oxyalkylating agent such as glycide, i. e., a nonvolatile oxyalkylating agent. At the end of the reaction period the mass obtained was a dark, viscous mixture. It could be bleached, of course, by use of charcoal, filtering earths, or the like.

Various examples obtained in substantially the same manner as employed are described in the following table:

peroxides or by other suitable means and the diglycidyl ethers may be indicated thus

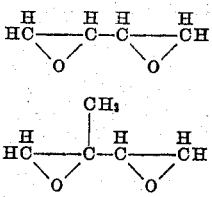

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

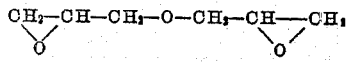

TABLE VIII

| Ex. No. | Oxyalkylated resin | Amt., gms. | Diepoxide used | Amt., gms. | Catalyst (NaOCH₃), grams | Xylene, gms. | Molar ratio | Time of reaction, hrs. | Max. temp., ° C. | Color and physical state |
|---|---|---|---|---|---|---|---|---|---|---|
| 1e | 2b | 217 | 3A | 17 | 1.1 | 234 | 2:1 | 3 | 140 | Dark viscous mass. |
| 2e | 4b | 260 | 3A | 17 | 2.4 | 477 | 2:1 | 4 | 145 | Do. |
| 3e | 7b | 247 | 3A | 17 | 1.3 | 264 | 2:1 | 3 | 150 | Do. |
| 4e | 10b | 609 | 3A | 17 | 3.1 | 626 | 2:1 | 4 | 148 | Do. |
| 5e | 2c | 249 | 3A | 17 | 1.3 | 266 | 2:1 | 2.5 | 150 | Do. |
| 6e | 3c | 402 | 3A | 17 | 2.0 | 419 | 2:1 | 4 | 146 | Do. |
| 7e | 5c | 708 | 3A | 17 | 3.6 | 725 | 2:1 | 5 | 152 | Do. |
| 8e | 2d | 192 | 3A | 17 | 1.0 | 209 | 2:1 | 2.5 | 142 | Do. |
| 9e | 3d | 319 | 3A | 17 | 1.6 | 336 | 2:1 | 3 | 147 | Do. |
| 10e | 6d | 249 | 3A | 17 | 1.2 | 250.7 | 2:1 | 3 | 155 | Do. |
| 1f | 2b | 217 | B1 | 27.5 | 1.2 | 244.5 | 2:1 | 3.5 | 145 | Do. |
| 2f | 4b | 460 | B1 | 27.5 | 2.4 | 487.5 | 2:1 | 4 | 150 | Do. |
| 3f | 7b | 247 | B1 | 27.5 | 1.3 | 274.5 | 2:1 | 4 | 152 | Do. |
| 4f | 10b | 609 | B1 | 27.5 | 3.1 | 636.5 | 2:1 | 5 | 158 | Do. |
| 5f | 2c | 249 | B1 | 27.5 | 1.3 | 276.5 | 2:1 | 4 | 146 | Do. |
| 6f | 3c | 402 | B1 | 27.5 | 1.2 | 429.5 | 2:1 | 5 | 150 | Do. |
| 7f | 5c | 708 | B1 | 27.5 | 2.6 | 735.5 | 2:1 | 5 | 152 | Do. |
| 8f | 2d | 192 | B1 | 27.5 | 1.0 | 219.5 | 2:1 | 3.5 | 148 | Do. |
| 9f | 3d | 319 | B1 | 27.5 | 1.7 | 346.5 | 2:1 | 4 | 150 | Do. |
| 10f | 6d | 249 | B1 | 27.5 | 1.2 | 251.8 | 2:1 | 3 | 152 | Do. |

TABLE IX

| Ex. No. | Oxyalkylated resin used | Probable molecular weight of reaction product | Amount of product, grams | Amount of solvent, grams |
|---|---|---|---|---|
| 1e | 2b | 4,680 | 4,680 | 2,340 |
| 2e | 4b | 9,540 | 4,770 | 2,385 |
| 3e | 7b | 5,280 | 5,280 | 2,640 |
| 4e | 10b | 12,520 | 6,260 | 3,130 |
| 5e | 2c | 5,320 | 5,330 | 2,670 |
| 6e | 3c | 8,380 | 8,370 | 4,180 |
| 7e | 5c | 14,500 | 7,250 | 3,625 |
| 8e | 2d | 4,180 | 4,195 | 2,105 |
| 9e | 3d | 6,720 | 6,720 | 3,360 |
| 10e | 6d | 50,160 | 5,016 | 2,508 |
| 1f | 2b | 4,890 | 4,890 | 2,445 |
| 2f | 4b | 9,750 | 4,880 | 2,440 |
| 3f | 7b | 5,490 | 5,490 | 2,745 |
| 4f | 10b | 12,730 | 6,365 | 3,182 |
| 5f | 2c | 5,530 | 5,540 | 2,775 |
| 6f | 3c | 8,590 | 8,590 | 4,295 |
| 7f | 5c | 14,710 | 7,355 | 3,678 |
| 8f | 2d | 4,390 | 4,385 | 2,190 |
| 9f | 3d | 6,930 | 6,930 | 3,465 |
| 10f | 6d | 50,370 | 5,040 | 2,520 |

PART 7

Reference is made to various patents to illustrate the manufacture of the non-aryl hydrophile polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937 to Groll et al.; and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl Another type of diepoxide is diisobutenyl dioxide as described in aforementioned U. S. Patent No. 2,070,990, dated February 16, 1937, to Groll, and is of the following formula:

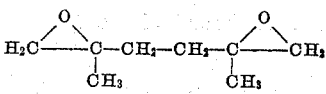

The diepoxides previously described may be indicated by the following formula:

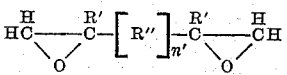

in which R' represents a hydrogen atom or methyl radical and R'' represents the divalent radical uniting the two terminal epoxide groups, and n' is the numeral 0 or 1. As previously pointed out, in the case of the butadiene derivative, n' is 0. In the case of diisobutenyl dioxide R'' is $CH_2 CH_2$ and n' is 1. In another example previously referred to R'' is $CH_2OCH_2$ and n' is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

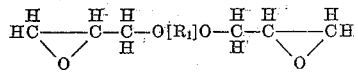

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (*a*) aryl radicals and (*b*) radicals in which 5 or more carbon atoms are united in a single uninterrupted single group. $R_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

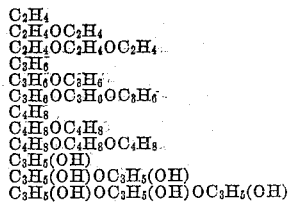

is derived actually or theoretically, or at least derivable, from the diol HOROH, in which the oxygen-linked hydrogen atoms were replaced by

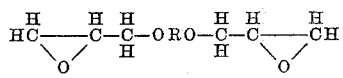

Thus, $R(OH)_n$, where $n$ represents a small whole number which is 2 or more, must be water-soluble. Such limitation excludes polyepoxides if actually derived, or theoretically derived at least, from water-insoluble diols or water-insoluble triols or higher polyols. Suitable polyols may contain as many as 12 to 20 carbon atoms or thereabouts.

Referring to a compound of the type above in the formula

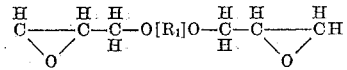

in which $R_1$ is $C_3H_5(OH)$, it is obvious that reaction with another mole of epichlorohydrin with appropriate ring closure would produce a triepoxide, or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this depoxide will be referred to as diglycidyl ether A.

Such material corresponds in a general way to the previous formula.

Using laboratory procedure we have reacted diethyleneglycol with epichlorohydrin and subsequently with alkali so as to produce a product which, on examination, corresponded approximately to the following compound:

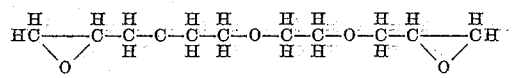

The molecular weight of the product was assumed to be 230 and the product was available in laboratory quantities only. For this reason, the subsequent table referring to the use of this particular diepoxide, which will be referred to as diglycidyl ether B is in grams instead of pounds.

Probably the simplest terminology for these polyepoxides, and particularly diepoxides, to differentiate from comparable aryl compounds, is to use the terminology "epoxyalkanes" and, more particularly, polyepoxyalkanes or diepoxyalkanes. The difficulty is that the majority of these compounds represent types in which a carbon atom chain is interrupted by an oxygen atom, and thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with carbonyl compound, such as formaldehyde or acetone so as to form the 5 membered ring, followed by conversion of the terminal hydroxyl groups into epoxy radicals. See also Canadian Patent No. 672,935.

PART 8

As pointed out previously, the reaction described in Part 6, preceding, resulted in an intermediate which was described thus: (A—B—A). The reaction described in the instant part has been indicated thus:

$$2(A—B—A)+C \rightarrow A—B—A—C—A—B—A$$

The manufacturing procedure is, of course, merely a continuation of what has been described previously in Part 6 and it is simply a switch from the one type of polyepoxide to the other. Of course, after the hydrophobe polyepoxide is added, sufficient time should pass to insure completeness of reaction before adding the hydrophile type. For purpose of illustration, however, the following examples are included:

Example 1g

The polyepoxide derived intermediate is Example 1e, previously described in Table VIII. This was obtained by use of a hydrophobe type polyepoxide. 234 grams were employed. These were reacted with 9.3 grams of diepoxide A, previously described. The amount of catalyst present was 2.4 grams of powdered sodium methylate. The amount of xylene was 243 grams. The molal ratio was 2 moles of the polyepoxide-derived intermediate to one mole of diepoxide A. The catalyst, the solvent, and the intermediate were all mixed together and stirred. The diepoxide was then added slowly over a period of less than a half-hour. The temperature was raised to 140° C. and held at this temperature for about 2 hours. The product obtained was a dark viscous mass when the solvent was evaporated. On completion of the reaction enough acetic acid was added to neutralize the catalyst.

In a second series of derivatives, hydrophile diepoxide B was employed. Both have been described previously in Part 7, preceding.

The data are summarized in hereto appended Tables X and XI.

It is not necessary to point out that after reaction with a reactant of the kind described which introduces a basic

Table X

| Ex. No. | Poly-epoxide derived intermediate product | Amt., gms. | Di-epoxide used | Amt., gms. | Catalyst (NaOCH$_3$), gms. | Xylene, gms. | Molar ratio | Time of reaction, hrs. | Max. temp., °C. | Color and physical St. |
|---|---|---|---|---|---|---|---|---|---|---|
| 1g | 1e | 234 | A | 9.3 | 2.4 | 243 | 2:1 | 2 | 140 | Dk. viscous mass. |
| 2g | 2e | 477 | A | 9.3 | 4.8 | 486 | 2:1 | 2 | 142 | Do. |
| 3g | 3e | 264 | A | 9.3 | 2.7 | 273 | 2:1 | 2 | 145 | Do. |
| 4g | 4e | 250 | A | 3.7 | 2.5 | 254 | 2:1 | 2 | 140 | Do. |
| 5g | 5e | 266 | A | 9.3 | 2.7 | 275 | 2:1 | 2 | 140 | Do. |
| 6g | 6e | 419 | A | 9.3 | 4.2 | 428 | 2:1 | 2 | 145 | Do. |
| 7g | 7e | 290 | A | 3.7 | 2.9 | 294 | 2:1 | 2 | 145 | Do. |
| 8g | 8e | 209 | A | 9.3 | 2.1 | 218 | 2:1 | 2 | 140 | Do. |
| 9g | 9e | 336 | A | 9.3 | 3.4 | 243 | 2:1 | 2 | 147 | Do. |
| 10g | 10e | 501 | A | 1.9 | 5.0 | 503 | 2:1 | 2 | 150 | Do. |
| 1h | 1f | 234 | B | 5.5 | 2.4 | 240 | 2:1 | 2 | 150 | Do. |
| 2h | 2f | 477 | B | 5.5 | 4.8 | 283 | 2:1 | 2 | 145 | Do. |
| 3h | 3f | 264 | B | 5.5 | 2.7 | 270 | 2:1 | 2 | 147 | Do. |
| 4h | 4f | 250 | B | 2.2 | 2.5 | 252 | 2:1 | 2 | 146 | Do. |
| 5h | 5f | 266 | B | 5.5 | 2.7 | 272 | 2:1 | 2 | 145 | Do. |
| 6h | 6f | 419 | B | 5.5 | 4.2 | 425 | 2:1 | 2 | 140 | Do. |
| 7h | 7f | 290 | B | 2.2 | 2.9 | 292 | 2:1 | 2 | 145 | Do. |
| 8h | 8f | 209 | B | 5.5 | 2.1 | 2.5 | 2:1 | 2 | 146 | Do. |
| 9h | 9f | 336 | B | 5.5 | 3.4 | 342 | 2:1 | 2 | 150 | Do. |
| 10h | 10f | 501 | B | 1.1 | 5.0 | 502 | 2:1 | 2 | 145 | Do. |

Table XI

| Ex. No. | Oxyalkylated resin used | Probable molecular weight of reaction product | Amount of product, grams | Amount of solvent, grams |
|---|---|---|---|---|
| 1g | 1e | 9,730 | 4,865 | 2,432 |
| 2g | 2e | 19,450 | 3,890 | 1,945 |
| 3g | 3e | 10,930 | 5,465 | 2,732 |
| 4g | 4e | 25,410 | 5,082 | 2,541 |
| 5g | 5e | 11,010 | 5,505 | 2,752 |
| 6g | 6e | 17,130 | 3,426 | 1,713 |
| 7g | 7e | 29,370 | 5,874 | 2,937 |
| 8g | 8e | 8,730 | 4,365 | 2,182 |
| 9g | 9e | 13,810 | 2,762 | 1,381 |
| 10g | 10e | 100,690 | 4,028 | 2,014 |
| 1h | 1f | 10,000 | 5,000 | 2,500 |
| 2h | 2f | 19,720 | 3,944 | 1,972 |
| 3h | 3f | 11,200 | 2,240 | 1,120 |
| 4h | 4f | 25,680 | 5,136 | 2,568 |
| 5h | 5f | 11,280 | 2,256 | 1,128 |
| 6h | 6f | 17,400 | 3,480 | 1,740 |
| 7h | 7f | 29,640 | 5,928 | 2,964 |
| 8h | 8f | 9,000 | 4,500 | 2,250 |
| 9h | 9f | 14,080 | 2,816 | 1,408 |
| 10h | 10f | 100,960 | 4,038 | 2,019 |

PART 9

As to the use of conventional demulsifying agents, reference is made to U. S. Patent No. 2,626,929, dated January 7, 1953, to De Groote, and particularly to Part 3. Everything that appears therein applied with equal force and effect to the instant process, noting only that where reference is made to Example 13b in said text beginning in column 15 and ending in column 18, reference should be to Example 1g. herein described.

PART 10

The products, compounds, or the like herein described can be employed for various purposes and particularly for the resolution of petroleum emulsions of the water-in-oil type as described in detail in Part 7 immediately preceding.

Such products can be reacted with alkylene imines, such as ethylene imine or propylene imine, to produce cation-active materials. Instead of an imine, one may employ what is a somewhat equivalent material, to wit, a dialkyl-aminoepoxypropane of the structure

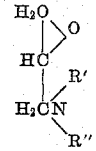

wherein R′ and R″ are alkyl groups.

nitrogen atom that the resultant product can be employed for the resolution of emulsions of the water-in-oil type as described in Part 7, preceding, and also for other purposes described hereinafter.

Referring now to the use of the products obtained by reaction with a polyepoxide and certain specified oxyalkylated products obtained in the manner described in Part 6 preceding, it is to be noted that in addition to their use in the resolution of petroleum emulsions they may be used as emulsifying agents for oils, fats, and waxes; as ingredients in insecticide compositions; or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

More specifically, such products, depending on the nature of the initial resin, the particular monoepoxide selected, and the ratio of monoepoxide to resin, together with the particular polyepoxide employed, result in a variety of materials which are useful as wetting agents or surface tension reducing agents; as detergents, emulsifiers or dispersing agents; as additives for lubricants, both of the natural petroleum type and the synthetic type; as additives in the flotation of ores, and at times as aids in chemical reactions in so far that demulsification is produced between the insoluble reactants. Furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

Having thus described our invention, what we claim as new and desire to secure by Letters Patent is:

1. A two-step manufacturing method, the first step involving an intermediate (ABA) which, in turn, represents the reaction products of (A) an oxyalkylated phenol-aldehyde resin containing a plurality of active hydrogen atoms, and (B) a phenolic polyepoxide containing at least two 1,2-epoxy rings free from reactive functional groups other than 1,2-epoxy and hydroxyl groups, and cogenerically associated compounds formed in the preparation of said polyepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehyde oxygen atom, the divalent radical

the divalent

radical, the divalent sulfone radical, and the divalent monosulfide radical —S—, the divalent radical $$-CH_2SCH_2-$$

and the divalent disulfide radical —S—S—; said phenolic portion of the diepoxide being obtained from a phenol of the structure

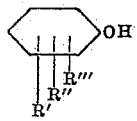

in which R', R", and R''' represent a member of the class consisting of hydrogen and hydrocarbon substituents of the aromatic nucleus, said substituent member having not over 18 carbon atoms; said oxyalkylated phenol-aldehyde resins, reactant (A) being the products of oxyalkylation of (aa) an alpha-beta alkylene oxide having not more than 4 carbon atoms and selected from the class consisting of ethylene oxide, propylene oxide, butylene oxide, glycide and methylglycide, and (bb) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in substantial absence of trifunctional phenols; said phenol being of the formula

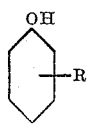

in which R is selected from the group consisting of phenyl and saturated hydrocarbon radicals having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and solids melting below the point of pyrolysis; with the final proviso that the reaction product be a member of the class of solvent-soluble liquids and solids melting below the point of pyrolysis; and said reaction between (A) and (B) being conducted below the pyrolytic point of the reactants and the resultants of reaction; said second step being the reaction product between 2 moles of the aforementioned intermediate (ABA) and one mole of (C) a non-aryl hydrophile polyepoxide containing at least two 1,2-epoxy rings and having two terminal 1,2-epoxy rings obtained by replacement of an oxygen-linked hydrogen atom in a water-soluble polyhydric alcohol by the radical

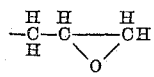

said polyepoxides being free from reactive functional groups other than 1,2-epoxy and hydroxyl groups and characterized by the fact that the divalent linkage uniting the terminal oxirane rings is free from any radical having more than 4 uninterrupted carbon atoms in a single chain; said final product being a member of the class consisting of non-thermosetting organic solvent-soluble liquids and solids melting below the point of pyrolysis with the final proviso that the reaction product be a member of the class of solvent-soluble liquids and solids melting below the point of pyrolysis; and said reaction between (ABA) and (C) being conducted below the pyrolytic point of the reactants and the resultants of reaction.

2. The product obtained by the manufacturing procedure defined in claim 1.

3. A two-step manufacturing method, the first step involving an intermediate (ABA) which, in turn, represents the reaction products of (A) an oxyalkylated phenol-aldehyde resin containing a plurality of active hydrogen atoms, and (B) a member of the class consisting of (1) compounds of the following formula:

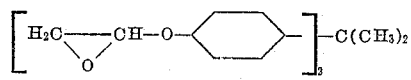

and (2) generically associated compounds formed in the preparation of (1) preceding, including monoepoxides; said oxyalkylated phenol-aldehyde resins, reactant (A), being the products derived by oxyalkylation of (aa) an alpha-beta alkylene oxide having not more than 4 carbon atoms and selected from the class consisting of ethylene oxide, propylene oxide, butylene oxide, glycide and methylglycide, and (bb) a fusible, organic solvent-soluble, water-insoluble phenol-aldehyde resin, said resin being derived by reaction between a difunctional monohydric phenol and an aldehyde having not over 8 carbon atoms and reactive toward said phenol; said resin being formed in the substantial absence of trifunctional phenols; said phenol being of the formula

in which $R^0$ is selected from the group consisting of phenyl and saturated hydrocarbon radicals, having not more than 24 carbon atoms and substituted in the 2,4,6 position; said oxyalkylated resin being characterized by the introduction into the resin molecule of a plurality of divalent radicals having the formula $(R_2O)_{n''}$ in which $R_2$ is a member selected from the class consisting of ethylene radicals, propylene radicals, butylene radicals, hydroxypropylene radicals, and hydroxybutylene radicals, and $n''$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and solids melting below the point of pyrolysis; with the final proviso that the reaction product be a member of the class of solvent-soluble liquids and solids melting below the point of pyrolysis; and said reaction between (A) and (B) being conducted below the pyrolytic point of the reactants and the resultants of reaction; said second step being the reaction product between 2 moles of the aforementioned intermediate (ABA) and one mole of (C) a non-aryl hydrophile polyepoxide containing at least two 1,2-epoxy rings and having two terminal 1,2-epoxy rings obtained by replacement of an oxygen-linked hydrogen atom in a water-soluble polyhydric alcohol by the radical

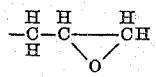

said polyepoxides being free from reactive functional groups other than 1,2-epoxy and hydroxyl groups and characterized by the fact that the divalent linkage uniting the terminal oxirane rings is free from any radical having more than 4 uninterrupted carbon atoms in a single chain; said final product being a member of the class consisting of non-thermosetting organic solvent-soluble liquids and solids melting below the point of pyrolysis; with the final proviso that the reaction product be a member of the class of solvent-soluble liquids and solids melting below the point of pyrolysis; and said reaction between (ABA) and (C) being conducted below the pyrolytic point of the reactants and the resultants of reaction.

No references cited.